US007953415B2

(12) United States Patent
Zhou

(10) Patent No.: US 7,953,415 B2
(45) Date of Patent: May 31, 2011

(54) METHOD AND SYSTEM FOR WIRELESS NUMBER PORTABILITY

(75) Inventor: Yi Zhou, Woodridge, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1123 days.

(21) Appl. No.: 11/145,030

(22) Filed: Jun. 3, 2005

(65) Prior Publication Data
US 2006/0293021 A1 Dec. 28, 2006

(51) Int. Cl.
*H04W 40/00* (2009.01)
(52) U.S. Cl. .............. 455/445; 455/432.1; 455/432.2; 455/461; 455/560; 455/561; 379/212.01; 379/221.13; 379/221.14; 379/220.01
(58) Field of Classification Search .......... 455/414.1, 455/461, 445, 560, 551, 432.1, 561, 432.2, 455/435.1; 379/221.13, 212.01, 221.14, 379/196, 207, 212, 220
See application file for complete search history.

(56) References Cited

U.S. PATENT DOCUMENTS

| | | | | |
|---|---|---|---|---|
| 6,049,714 A * | 4/2000 | Patel | ............................. | 455/433 |
| 6,091,801 A * | 7/2000 | Gulik | ......................... | 379/29.02 |
| 6,138,023 A * | 10/2000 | Agarwal et al. | ............... | 455/445 |
| 6,161,017 A * | 12/2000 | Britt et al. | ...................... | 455/445 |
| 6,226,517 B1 * | 5/2001 | Britt et al. | ...................... | 455/445 |
| 6,240,293 B1 * | 5/2001 | Koster | .......................... | 455/445 |
| 6,421,442 B2 * | 7/2002 | Slutsman et al. | ......... | 379/221.13 |
| 6,535,599 B1 * | 3/2003 | Torrey et al. | ............. | 379/221.13 |
| 6,738,633 B2 * | 5/2004 | Kim et al. | ...................... | 455/461 |
| 6,914,973 B2 * | 7/2005 | Marsico | .................... | 379/221.13 |
| 7,054,652 B2 * | 5/2006 | Luis | ............................... | 455/461 |
| 7,142,862 B2 * | 11/2006 | Halsell | ........................... | 455/445 |
| 7,254,391 B2 * | 8/2007 | McCann | ........................ | 455/433 |

OTHER PUBLICATIONS

TIA/EIA-41-D Enhancements for Wireless Number Portability Phase II, TIA Standard, TIA-756-A, Telecommunications Industry Association, Jan. 2002.
TIA Standard, TIA/EIA-41-D Enhancements for Wireless Number Portability Phase II, TIA-756-A, Jan. 2002, pp. 1-81, Telecommunications Industry Association, Arlington, VA, 2002.
TIA/EIA Telecommunications Systems Bulletin, Wireless Network Reference Model, TSB100-A (Revision of TSB100), Mar. 2001, Telecommunications Industry Association, Arlington, VA, 2001.

* cited by examiner

*Primary Examiner* — Rafael Perez-Gutierrez
*Assistant Examiner* — Olumide T Ajibade Akonai
(74) *Attorney, Agent, or Firm* — Fay Sharpe LLP

(57) ABSTRACT

A method and system for providing improved wireless number portability. This invention allows the mobile switching center (MSC) to use a separate database to store the number portability information gathered earlier through sending NPreq messages to the number portability database (NPDB) and various strategies for refreshing or updating the internal database. The invention enables the MSC to use the separate database to check whether a portable number is ported and what the associated location routing number (LRN) if it is ported, so that the MSC does not need to send NPreq messages to the NPDB many times for the same ported number. This invention may apply to any number of switching systems, including CDMA, GSM and UMTS mobile switching systems.

15 Claims, 3 Drawing Sheets

FIG. 2

NUMBER PORTABILITY TABLE

| DIRECTORY NUMBER (DN) | PORTED ? | LOCAL ROUTING NUMBER (LRN) | TIME STAMP | OTHER DATA |
|---|---|---|---|---|
| XXX-XXXX | YES | NPA-XXX-XXXX | 2005/06/06 16:48:53 | ... |
|  |  |  |  |  |
|  |  |  |  |  |

FIG. 3

DATA BLOCK (TABLE)

| | |
|---|---|
| DN DATA | 62 |
| PORTED NUMBER DATA | 64 |
| LRN DATA | 66 |
| TIMESTAMP DATA | 68 |
| ⋮ | |
| OTHER DATA | 70 |

METHOD AND SYSTEM FOR WIRELESS NUMBER PORTABILITY

BACKGROUND OF THE INVENTION

This invention relates generally to the art of communication systems. While the invention is particularly directed to a method and system for providing improved wireless number portability, and will be thus described with specific reference thereto, it will be appreciated that the invention may have usefulness in other fields and applications.

By way of background, the standard for wireless number portability has been produced by the Telecommunications Industry Association (TIA) and is set forth in TIA-765-A, which is incorporated by reference herein and is available from Global Engineering Documents, 15 Inverness Way East, Sales-C303B, Englewood, Colo., USA 80112-9649.

Per TIA-765-A, an NPreq (Number Portability Request) message is sent from a MSC (Mobile Switching Center) to a NPDB (Number Portability Database) on a per call basis for a portable number (a number within a portable NPA-NXX range). Now with FCC-mandated number portability, more and more numbers are being ported from one service provider to another. Once a number is ported, the corresponding NPA-NXX range becomes a portable range. Sooner or later, all NPA-NXX ranges become portable ranges and all numbers are going to be portable numbers, but they will not necessarily be ported numbers.

A Directory Number (DN) is a telephone network routing address for a subscriber terminal (or mobile station), often simply referred to as the telephone number. For a DN that can be called tens, hundreds, or even thousands times (e.g., business number) a day, especially during busy hours, if it is a portable number, then NPreq messages are repeatedly sent per call for the same portable number. The messages from the MSC to the NPDB take significant processing times at the MSC and at the NPDB, introduce call delay time while the MSC waits for the NPreq return result from the NPDB, increase traffic between the MSC and the NPDB, and increase costs for the service provider that owns the MSC (if the cost of the NPreq is charged to the service provider on a per message basis by the NPDB service provider).

The present invention contemplates a new and improved method and system that resolves the above-referenced difficulties and others, including reducing the number of NPreq messages sent from the MSC to the NPDB for calls to a portable number, improving system (MSC) performance (e.g., increase busy hour calls supported by the MSC), reducing network traffic and improving network performance, especially during busy hours, and saving service provider costs associated with sending NPreq messages to the NPDB.

SUMMARY OF THE INVENTION

Embodiments of a method and system for providing improved wireless number portability are provided. This invention allows the MSC to use a separate database to store the number portability information gathered earlier through the process of sending NPreq messages to the NPDB and receiving the results and employs various strategies for refreshing or updating the internal database. The invention enables the MSC to use the separate database to check whether a portable directory number is ported and the associated LRN if it is ported, so that the MSC does not need to send NPreq messages to the NPDB many times for the same ported number. This invention may apply to CDMA, GSM and UMTS mobile switching systems.

In one aspect of the invention there is provided a call processing method to be implemented in a wireless communications network. The method comprises receiving a call to a directory number via a switching element, checking whether number portability information for the directory number is stored in a first database in communication with the switching element, and routing the call based upon the number portability information for the directory number, if there is number portability information for the directory number stored in the first database. If, on the other hand, there is no number portability information for the directory number stored in the first database, then the method further comprises sending a number portability request message to a second database in communication with the switching element, receiving a number portability request return result from the second database, inserting a number portability record for the directory number in the first database, and routing the call using the number portability request return result received from the second database.

In another aspect of the invention there is provided a call processing system in a wireless communications network. The system comprises a switching element for processing wireless calls, a first database in communication with the switching element for storing directory number information, and means for facilitating communication between a caller and the switching element, where the switching element is programmed to receive a wireless call to a directory number, check whether number portability information for the directory number is stored in the first database and route the call based upon the number portability information for the directory number, when there is number portability information for the directory number stored in the first database. The switching element is further programmed to send a number portability, request message to a second database, receive a number portability request return result from the second database, insert a number portability record for the directory number in the first database, and route the call using the number portability request return result from the second database, when there is no number portability information for the directory number stored in the first database.

In yet another aspect of the present invention there is provided an alternative embodiment of the call processing system. This system comprises receiving means for receiving a call to a directory number; checking means for checking whether number portability information for the directory number is stored in a first database in communication with the switching element; routing means for routing the call based upon the number portability information for the directory number; sending means for sending a number portability request message to a second database in communication with the switching element; accepting means for accepting a number portability request return result from the second database; inserting means for inserting a number portability record for the directory number in the first database; and routing means for routing the call using the number portability request return result from the second database.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings wherein:

FIG. 2 is a number portability table stored in a database in accordance with aspects of the present invention;

FIG. 3 is a memory layout of data stored in a database in accordance with aspects of the present invention.

DETAILED DESCRIPTION OF THE PREFERRED EMBODIMENTS

Figure 1:
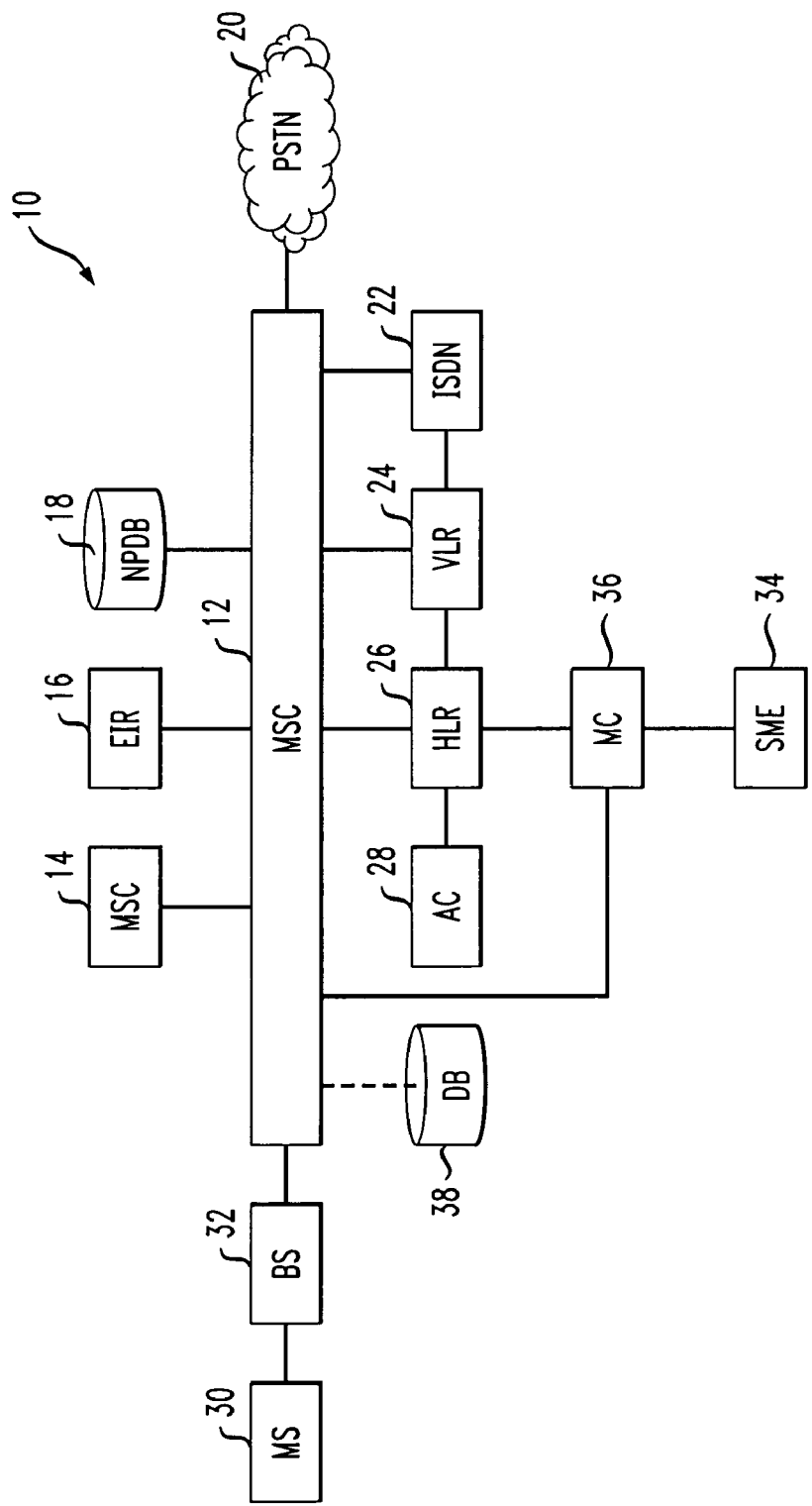
FIG. 1 is a block diagram of a communications network suitable for implementing aspects of the present invention.

The following abbreviations (per TIA-765-A) will be used throughout this specification and in the drawings:

| | |
|---|---|
| AC | Authentication Center |
| BS | Base Station |
| DN | Directory Number |
| EIR | Equipment Identity Register |
| HLR | Home Location Register |
| ISDN | Integrated Services Digital Network |
| LRN | Location Routing Number |
| MC | Message Center |
| MDN | Mobile Directory Number |
| MS | Mobile Station |
| MSC | Mobile Switching Center |
| NPDB | Number Portability Database |
| NP | Number Portability |
| PSTN | Public Switched Telephone Network |
| SME | Short Message Entity |
| VLR | Visitor Location Register |
| WNP | Wireless Number Portability |

Referring now to the drawings wherein the showings are for purposes of illustrating the preferred embodiments of the invention only and not for purposes of limiting same, FIG. 1 illustrates a wireless network 10 representing an interconnection of the network entities required to implement the enhanced call return feature. The wireless model 10 appears in Chapter 1 (or Part 1) of revision D of the IS-41 (Interim Standard 41) wireless intersystem operation standard. Revision D of the IS-41 standard is incorporated herein by reference in its entirety. Copies of the most recent revision (and/or earlier revisions) of the IS-41 standard may be obtained from Global Engineering Documents, 15 Inverness Way East, Sales-C303B, Englewood, Colo., USA 80112-9649.

The IS-41 standard is more recently referred to as a TIA/EIA-41 standard, where EIA refers to the Electronics Industry Association. The designations IS-41 and TIA/EIA-41 may be used interchangeably. Further, the term "wireless network" as used herein is contemplated to include analog or digital cellular mobile networks (irrespective of the underlying digital technology, e.g., CDMA, TDMA, etc.) and any other radio network that employs intersystem messaging (IS-41 based or not) as part of mobile wireless communication. Although the discussion herein focuses on IS-41 number portability in a wireless network, it is understood that the methodology described herein may be implemented with other non-IS-41 messages that may be functionally similar to those described herein.

It is known in the art that IS-41 is the technical standard that specifies the network model, functions, protocols, and services that provide mobile telecommunications networks intersystem operations. The IS-41 specification provides a standard protocol for the operations that enable subscriber mobility between MSCs (Mobile Switching Centers) in a single wireless network or in two different wireless networks operated by a single or two different service providers. In other words, the IS-41 standard specifies the necessary signaling mechanism to accomplish seamless communication in the mobile world. A brief description of each of the network entities is given below.

The network entities in FIG. 1 include an anchor mobile switching center (MSC) 12, a visiting (or serving) MSC 14, an equipment identity register (EIR) 16, a number portability database (NPDB) 18, a public switched telephone network (PSTN) 20, an integrated services digital network (ISDN) 22, a visitor location register (VLR) 24, a home location register (HLR) 26, an authentication center (AC) 28, a mobile station (MS) 30, a base station (BS) 32, a short message entity (SME) 34, and a message center (MC) 36.

In accordance with the present invention, the network 10 also includes an additional database 38, separate from the NPDB 18, for storing data relating to number portability. Generally, the database 38 is located within the MSC 12 (i.e., internally), although it can be a stand-alone entity.

These network entities represent functional blocks or units that perform various logical functions that are implementation-independent. In other words, one or more of the above-mentioned network entities may be constructed in different physical configurations by different mobile service providers and, therefore, the model shown in FIG. 1 does not imply either a specific physical implementation of a network entity shown therein or a specific interconnection between two or more network entities shown therein. For example, the discussion below identifies the VLR 24 as associated with the anchor MSC 12 as well as with the serving MSC 14. However, the diagram in FIG. 1 does not show a direct physical interconnection between the VLR 24 and the serving MSC 14. The sharing of the VLR 24 may be possible, for example, when both of the mobile switching centers 12, 14 are operated by a common service provider.

It is therefore emphasized that the arrangement shown in FIG. 1 is for illustration only. The network entities shown in FIG. 1 may not represent actual physical connection, especially when call-routing involves many more cells and, thus, many more network entities, in a wireless network. For example, in one embodiment, the serving MSC 14 may have its own HLR and VLR (not shown) and may be maintained by a service provider that is different from the service provider maintaining the anchor MSC 12 and its associated network entities. In short, the network topology in FIG. 1 is a symbolic representation of various functional blocks comprising a wireless network and does not imply a fixed, physical implementation of those functional blocks. A service provider may choose not to provide all the network entities or all the interconnections illustrated in FIG. 1 in a given geographic area or cell. Further, more than one functional unit may be implemented on a single physical device, or, alternatively, some functional blocks may represent separate physical devices.

It is noted that the terms "mobile subscriber," "network subscriber," "mobile station," and "mobile user" are used interchangeably herein. The "mobile subscriber (MS) 30 may be a human individual who has subscribed to one or more mobile wireless services. The term "mobile subscriber," as used herein, also includes a mobile service user who uses the subscribed wireless service(s) with a mobile telephone handset or with a computer equipped for wireless communication or with any other similar device. Further, "mobile communication" may include voice, data or any other information communicated via a mobile wireless network. The MS 30 includes a wireless terminal used by the subscriber to access network services over a radio interface. The wireless terminal may comprise a portable unit (e.g., hand-held unit), a unit installed in a vehicle, or a fixed location unit. The wireless terminal is the interface equipment used to terminate the radio path at the subscriber.

The mobile switching centers (MSC) 12, 14 are functional entities that represent automatic wireless message switching elements. An MSC may be distinguished from an MTSO (mobile telephone switching office), which may refer more to the physical architecture of the wireless switching office including switching hardware, the physical building, etc. An MSC typically provides interface for user traffic between a cellular network and other public switched networks (PSTNs) or other MSCs in the same or other networks. An MSC provides basic switching functions and coordinates the establishment of calls to and from cellular subscribers. Thus, an MSC is responsible for various call processing as well as mobile subscriber mobility management functions.

An MSC first receiving a call placed by a caller (calling a mobile subscriber) may be referred to as the "anchor MSC" (e.g., the MSC 12), whereas an MSC that finally delivers the call to a mobile subscriber (and thus completes the call) may be referred to as the "serving MSC" (e.g., the MSC 14). The geographic location of the mobile subscriber (MS) at the time of call reception (from the external telephone network, e.g., the PSTN 20 or other wireless network) determines whether the anchor MSC 12 and the serving MSC 14 are the same or different.

The functional block labeled PSTN 20 may include an external wire line telephone network carrying a call from an external network caller to the mobile subscriber (MS) 30 or vice versa. There is an interconnection between the PSTN 20 and a switching center in the mobile network, here, the MSC 12. The PSTN 18 may include a digitally switched telephone network, the POTS (plain old telephone system), the Internet or other external networks, including a local area network (LAN) or other dissimilar mobile network. It is known that mobile networks usually interoperate with other networks (e.g., the PSTN 20) to complete calls.

The EIR 16 is an entity that is the register to which user equipment may be assigned for record purposes.

ISDN 22 is defined in accordance with the appropriate ANSI TI Standards.

The SME 34 is an entity that composes and decomposes short messages. The SME 34 may, or may not be located within, and be indistinguishable from, the HLR 26, the MC 36, the VLR 24, the MS 30, or the MSC 12.

The MC 36 is an entity that stores and forwards short messages. The MC 36 may also provide supplementary services for Short Message Service (SMS). In one embodiment, the MC 36 is an independent physical entity in the wireless network. Alternatively, it may be part of the HLR 26. SMS is a packet-switched messaging service that provides store-and-forward functions for the handling of short messages destined to or originated from the mobile subscribers.

The AC 28 is an entity that manages authentication information related to the MS 30. The AC 28 may, or may not be located within, and be indistinguishable from the HLR 26. The AC 28 may serve more than one HLR.

The BS 32 is an entity that provides the means for the MS 30 to access network services using radio. Although not shown, it includes a base station controller and a base transceiver system.

A wireless network may interconnect with an SS7 (Signaling System No. 7) network as a backbone network to transport IS-41 signaling messages through the mobile telecommunications network. SS7 packets may be used to convey signaling information from an originating point to a destination point through multiple switching nodes in the mobile network, which may encompass more than one wireless network operated by one or more service providers. SS7-based transactions may query databases and invoke functions at remote points throughout the mobile wireless network to establish and maintain calls and to perform reliable call management functions. An SS7 backbone network may be owned and operated by the same service provider as the one operating the interconnected wireless network. Alternatively, a wireless service provider may join an independent SS7 network provider to accomplish desired call routing. Service control points (not shown) are special types of end signaling points in an SS7 network that perform transaction processing of remote operations.

The location registers, e.g., the HLR 26 and the VLR 24, are data-based systems that assist in controlling mobile subscriber services and contain the records and stored information related to mobile subscribers of a particular mobile service provider. The location registers are queried by other network entities to obtain the current status, location, and other information to support calls to and from mobile users within the wireless network. Location registers may also contain network address translation information to assist in the routing of calls to the appropriate network destination.

The HLR 26 is typically a primary database repository of subscriber information used to provide control and intelligence in wireless networks. The HLR 26 thus contains a record of subscriber information such as features selected by the subscriber as part of the mobile service plan (e.g., call forwarding, calling name service, etc.), status of the subscriber (e.g., active, inactive, suspended service, etc.), the subscriber's mobile directory number (i.e., the number a calling party has to call to reach the mobile subscriber), information about the current geographic location of the mobile subscriber, etc. The HLR 26 may be shared by more than one MSC 12, 14. The HLR 26 is generally managed by the wireless service provider company and represents the "home" database of subscribers who have subscribed for the wireless service in that home area served by the wireless service provider.

The VLR 24 is a database that primarily maintains temporary records associated with individual network subscribers. Thus, the VLR 24 represents a "visitor's" database for mobile subscribers who are being served in a defined local area. The VLR 24 is also managed by a wireless service provider. However, the VLR 24 and the HLR 26 may be managed by the same or by different wireless service providers depending on the current geographic location of the mobile subscriber in the wireless network. The term "visitor" may refer to a mobile subscriber who is being served by one or many systems in the home service area, or an MS who is roaming in a non-home, or "visited" service area (i.e., service area of a service provider that is different from the service provider the MS has signed up with). The VLR 24 generally contains subscriber location, status, and service features information that is derived from the relevant HLR, here, HLR 26. The serving MSC 14 may access its associated VLR to retrieve information for the handling of calls to and from visiting subscribers. Similar to the HLR 26, the VLR 24 may also serve one or more MSCs as illustrated in FIG. 1.

The NPDB 18 is the network element that contains the routing information necessary to support number portability. The NPDB 18 provides the association between the called party and the carrier LRN (local routing number), identifying the switch to which the call should now be routed. The NPDB 18 stores all ported numbers within the ported domain. A Ported Number is a Directory Number (DN) that has been ported—or moved—from one service provider to another. A Ported Number is also a Portable Number. A Portable Number is a Directory Number (DN) that is part of a portable range (e.g., NPA-NXX) from which one or more DNs may have been ported. A Portable Number is not necessarily a Ported Number.

A "Donor" is the switch from which a ported DN was originally ported, while a "Recipient" is a switch to which a ported DN has been ported. A Ported Number Translation Indicator is an indicator within the ISUP. A Forward Call Indicator (i.e., the Mbit) is set to indicate that the query to a Number Portability Database (NPDB) 18 has been successfully performed, or that one is not needed (e.g., intersystem termination to a TLDN). The Ported Number Translation Indicator is used by subsequent switches to prevent extraneous NPDB queries.

The NPDB 18 is accessed by the MSC 12 to provide the LRN value for the ported MDN in order to correctly route the call. The NPDB 18 contains the applicable number portability information transmitted from the NPAC Service Management System (SMS) to the service provider's Local Service Management System (LSMS). Each service provider will either own or have access to a NPDB/LSMS that will contain the mapping between the MDN and the LRN. Carriers today have the option of choosing between two different LNP database architectures for accessing the LRN associated with a particular DN: an integrated STP/SCP configuration or an STP with an adjunct SCP.

The separate database 38 stores data relating to portable directory numbers, including their corresponding portability information such as an indication of whether the number is ported or not and the associated LRN if it is a ported number. It may also contain optional information, such as, for example, a timestamp indicating the last time that an NPreq was sent from MSC 12 to the NPDB 18 to obtain this information.

Portable directory number data may be stored in the database 38 in various configurations, such as in a number portability table 40 as shown in FIG. 2. The table 40 includes at least one key, in this case, the directory number 42. Thus, for each key or directory number 42, there are any number of associated fields, such as a "ported or not" field 44, a local routing number field 46, a time stamp field 48, and one or more additional fields 50 that may be helpful to implement the invention. The associated fields collectively define a number portability record 52 for each directory number 42. For example, the service provider may choose to add one or more fields to the table 40 regarding directory number usage information, if a strategy for maintaining n records in the internal table 40 is based upon "least frequently used records to be removed first."

The database 38 may also store number portability data for a directory numbers in a record (or data block) 60, as shown in FIG. 3. Such a record 60 is shown as a super data block, not all of whose fields (or data sub-blocks) are filled for a particular conference call. The super data block 60, as known in the art, can be accessed from the identity of any one of several fields (or data sub-blocks) in the super block. As shown, the super block 60 includes any number of data sub-blocks, including a first sub-block 62 that contains DN data (key), a second sub-block 64 that contains data indicating whether the DN is "ported or not" (attribute), a third sub-block 66 that contains LRN data (if the DN is a ported number) (attribute), and a fourth sub-block 68 that contains time stamp data when this information is retrieved from NPDB through the NPreq (attribute). Of course, it is to be understood that any number of additional sub-blocks 70 may be provided in the super block 40 for storing other data.

The FCC Number Portability Report and Order, CC Docket 95-116, mandates that all Commercial Mobile Radio Service (CMRS) providers provide the capability to deliver calls from their network to ported numbers, that is, numbers that have been transferred from one telephone switch to another. Number portability gives subscribers the ability to retain their numbers when they change to a different service provider within their own rate center area. The rate center is defined as the geographical home service area.

When the first number is ported out of an NPA-NXX block, that block is called a portable block. Any number that belongs to the portable block must be considered as a portable number (potential ported number) and the MSC must send an NPreq message when call processing is performed for that number.

The NPreq message (TIA-41 message) is sent from the MSC 12 to the NPDB 18. The LRN is typically a ten-digit number (e.g., NPA-XXX-XXXX) that uniquely identifies a switch to which a ported DN has been ported. Every ported subscriber's DN is associated with a specific LRN (assigned by the service provider). An LRN is essentially a network routing address (e.g., 10-digit NANP formatted number) assigned to uniquely identify a switch that serves ported numbers. Thus, the LRN is used to route a call to the ported subscriber. The NPDB 18 can receive and process TIA-41 NPreq messages and respond to the network entity that sent an NPreq query.

According to the current standard for Wireless Number Portability (WNP), TIA-756-A, the anchor MSC 12 sends an NPreq message to the NPDB 18 when a call is made to a portable number (a number in a NPA-NXX portable range). There are various call scenarios per the current standard, including, but not limited to, the following scenarios:

1. Mobile origination—i.e., a call is made to a portable number by a mobile served by the current MSC (see TIA-756-A: 4.X.2, 4.X.3, 4.y.l, and 4.y.2).

2. Call forwarding or call redirection—i.e., the MSC receives an incoming call and needs to provide call forwarding to a portable number if the called MDN has subscribed to a corresponding call forwarding service (e.g., immediate call forwarding, busy call forwarding, no answer call forwarding, etc) and the call forwarding destination number is a portable number, or the MSC needs to redirect the call to a portable number (see TIA-756-A: 4.y.3, 4.y.5, 4.y.6).

3. Receiving untranslated incoming call to a ported out number—i.e., where "untranslated incoming call" means that no indication in the incoming call for NPreq has been attempted. In essence, this means that a number has been ported from the current MSC to another MSC or wireline. However, the current MSC may still receive incoming calls to the ported out number if no NPreq has been attempted by the switch that originates the call or any upstream switch for routing the call to the current MSC (TIA-756-A: 4.Z.1, 4.Z.2).

4. Receiving untranslated incoming call to a portable number and the current MSC chooses to perform the NPreq process before LOCREQ (TIA-756-A 4.z.3, 4.z.4).

In general, upon receiving an NPreq message, the NPDB 18 may perform several functions. For example, if the called DN is a ported number (a DN ported from one service provider to another), then the NPDB 18 responds with an npquery return result with LocationRoutingNumber (LRN) and the originating MSC routes the call based on the LRN.

Otherwise, the NPDB 18 responds with an empty LRN message and the originating MSC routes the call based on a digit analysis on the called DN.

The NPreq message is sent from the MSC 12 to the NPDB 18 on a per call basis for a portable number. An NPA-NXX range becomes portable range once one or more DNs in this range have been ported. Every number in the portable range is a portable number. With more and more ported numbers, sooner or later, all NPA-NXX ranges become portable ranges and all numbers are going to be portable numbers (although not necessarily ported numbers).

For a DN that can be called tens, hundreds, or thousands times (e.g., business number) a day, especially during busy hours, if it is a portable number, NPreq messages are repeatedly sent per call for the same portable number. The messages from the MSC 12 to the NPDB 18 take significant processing times at the MSC 12 and the NPDB 18, introduce call delay time while the MSC 12 waits for NPquery return result from the NPDB 18, increase traffic between the MSC 12 and the NPDB 18, and increase costs for the service provider that owns the MSC 12 (if the cost of NPreq is charged to the service provider on per message basis).

Thus, the wireless network 10 includes the separate database 38 for the purpose of storing the number portability information gathered earlier through sending NPreq messages to the NPDB 18 and various methods for refreshing and/or updating the database 38. The invention allows the MSC 12 to use the database 38 to determine whether a number is ported and the associated LRN, if available, so that the MSC 12 does not need to send an NPreq to the NPDB 18 repeatedly for the same ported number.

One approach is to store the first n NPreq results per day in at least one NP table 40 (data block 60) in the database 38. The maximum size of the NP table 40 can be determined through statistical performance data, e.g., gradually grow the size of the table 40 and check the percentage of NPreq messages being reduced until there is no significant reduction achieved by further growing. This approach represents a compromise between NPreq reduction and the cost of space for the internal tables.

The time interval for flushing and using the table 40 in the database 38 may be determined by the service provider, depending on the time interval that the service provider promises for porting numbers. For example, a strategy of protecting busy hour performance can be as following: if the service provider promises six hours for porting a number, the busiest six hours can be determined and the internal table 40 is emptied before the busiest six hours, data can be inserted into the internal NP tables and be used by the MSC during the busiest six hours, and the MSC does not use the internal NP table 40 after that time interval.

The results of the first n NPreq results after the internal NP table 40 is emptied are stored in the database 38 during the usable time interval for the internal NP table 40. When a call is made to a portable number and the MSC needs to check whether it is a ported number, as in the various call scenarios mentioned above. Thus, a method 100 of processing such a call in the wireless network 10 is shown in FIG. 4.

Figure 4:
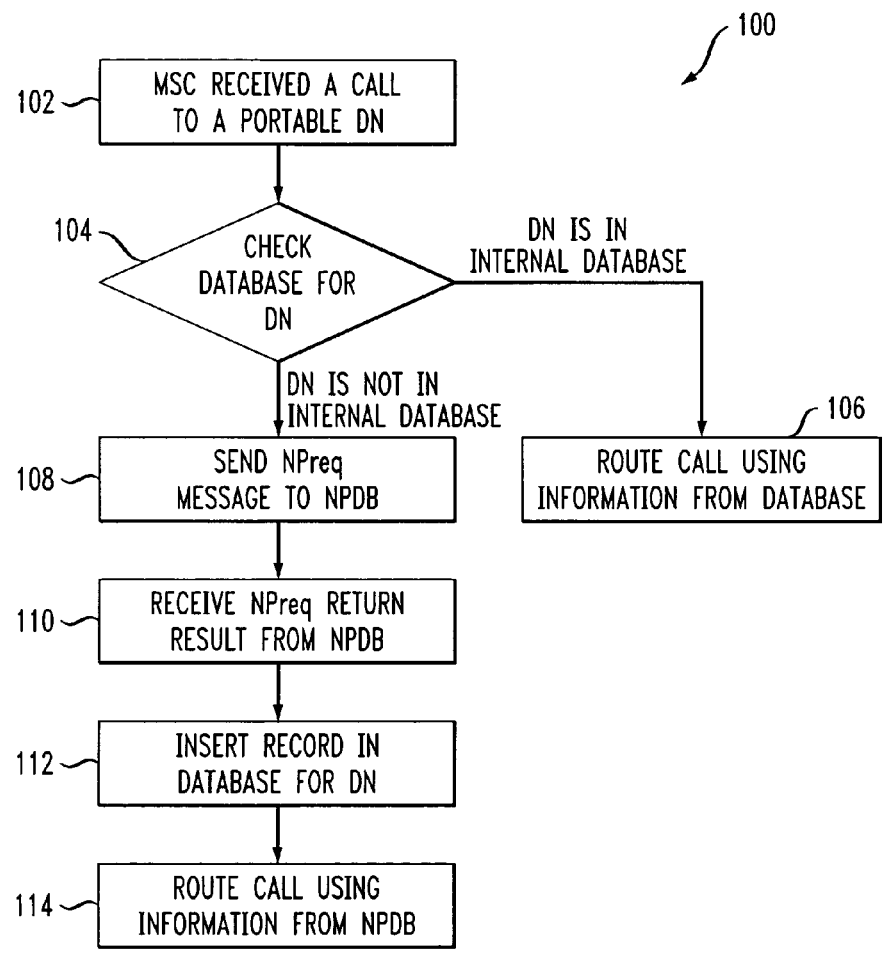
FIG. 4 is a flow chart of a call processing method according to aspects of the present invention.

Referring now to FIG. 4, the switching element, in this case the MSC 12, initially receives a call to a portable DN (102). The MSC 12 first checks the records in the internal database 38 for information relating to the called DN (104). If the internal database 38 already includes a record in a table 40 for this called DN, then the MSC 12 does not send an NPreq message to the NPDB 18. Rather, the MSC 12 just uses the information from the internal NP table 40, in generally the same way as information from npreq return result would be processed (106). If, however, the database 38 does not have an entry for this called DN, then the MSC 12 sends an NPreq message to the NPDB 18 (108). After an npreq return result is received from the NPDB 18 (110), the MSC 12 inserts a record in the database 38 for the called DN (112). This call is routed to the serving MSC 14 based upon the npreq return result (114). However, any subsequent calls to this called DN (before the next time that the database 38 is emptied and within the database 38 usable time interval) will not need to send an NPreq to the NPDB 18.

In the event that a DN is ported from one service provider to another while the MSC 12 is using the internal NP table 40 to route the call, the MSC 12 would delete the corresponding internal NP table record if the call fails in routing based on outdated internal NP table information.

The current TIA-756A mentions "ISUP release cause value 26" for a misrouted call to a ported number, although no further refinement is included. Accordingly, if all switches in the network support "ISUP release cause value 26," then the MSC 12 would release the ISUP trunk for receiving the misrouted call with release cause value 26. The originating MSC that routes the call based on the internal NP table 40 is able to know that it misrouted the call based on outdated NP information upon the receiving the ISUP release with release value 26 from the outgoing ISUP trunk used for routing this call. Then, the MSC 12 shall delete the corresponding internal NP table record.

If not all switches support "release cause value 26," then the originating MSC 12 cannot count on receiving ISUP "release cause value 26" for misrouted calls. In such a situation, the service provider can be cautious and program the MSC 12 to delete the corresponding record 52 in the internal NP table 40 if the call fails routing based on the internal NP table 40, no matter whether the call fails due to misrouted or not.

After the internal NP table 40 usable time interval (assume the performance is not critical any more), the MSC 12 sends NPreq messages to the NPDB 18 when a call is made to a portable number, instead of using the internal NP table 40.

Another approach is to store data relating to an "aging" interval for each record in the internal NP table 40. This approach is similar to the first one described above, with the difference being that instead of flushing and inhibiting the whole internal NP table 40 at a certain time, each record 52 in the internal NP table 40 includes a timestamp 48 indicating when the record was inserted by using the NPreq return result from the NPDB 18. The MSC 12 can define an "aging" interval for these records. "Aged" records can be removed from the internal NP table 40 through a periodical audit on the database 38. Alternatively, the MSC 12 can remove an aged record from internal NP table 40 when a call is made to the corresponding DN and the MSC 12 can check the internal NP table 40 for it. After removing the aged internal NP record, the MSC 12 would send an NPreq message to the NPDB 18 to continue the call.

With this alternative approach, the service provider is able to reduce repeated NPreq messages all the time and not be limited to protect certain time intervals (e.g., during busy hours).

Yet another approach is to update the internal NP table 40 in the database 38 when the MSC 12 misroutes a call based on information in the internal NP table 40 (applicable if ISUP release with misrouted call indication, cause value 26, is supported by all switches in the network).

Again, this is similar to the first two approaches for having a separate database 38 to store NP information for portable numbers, with the difference being that there is no need to flush and inhibit the internal NP table 40 as in the first approach or age the records in it as in the second approach. For example, a record 52 can be updated when the MSC 12 misroutes a call based on information in the internal NP table 40 and receives an ISUP release with misrouted call indication, release cause 26, from a downstream switch.

The MSC 12 generally uses the internal NP table 40 in the database 38 to find NP information for a portable number if a record for the portable number exists in the internal NP table 40.

If the MSC 12 routes a call to a portable number based on the NP information in the internal NP table 40 and it receives an ISUP release with misrouted call indication, release cause 26, from a downstream switch for routing the call, the MSC 12 considers the record in the internal NP table 40 for this portable number is outdated. The MSC 12 sends an NPreq message to the NPDB 18 and waits for an NPreq return result from the NPDB 18. Once the NPreq return result is received, it is compared with the record from the database 38. If they are different, then the MSC 12 updates the internal NP table 40 with the information from the NPreq return result and routes the call again based on the information from the NPreq return result. If they are the same (the NPDB 18 is not updated yet), the MSC 12 deletes the corresponding record in the internal NP table 40 for this portable number, and fails the call.

If the NPreq return result is not received or an NPreq return error/reject is received, then the MSC 12 deletes the corresponding record in the internal NP table 40 for this portable number and "fails" the call.

With this approach, the MSC 12 does not "fail" any call due to using the internal NP table 40 in the database 38. However, this approach depends on the condition that ISUP release with misrouted call indication, cause value 26, is supported by all switches in the network 10.

There are variations on selecting n records in the internal NP table 40 (applicable to all strategies). Since the first n NPreq may not be for the n most frequently called DN, a different way of selecting n records in the internal NP table 40 may be used. For example, instead of storing the results of the first n NPreq messages into the internal NP table 40, the MSC 12 can determine the n most frequently called portable DN based on statistical data and only allow records for those numbers to be inserted into the internal NP table 40.

Also, as noted earlier, the service provider may choose to add fields to the table 40 concerning usage information (e.g., usage frequency), if a strategy for maintaining n records in the internal table 40 is based upon "least frequently used records to be removed first." That is, when a new record needs to be inserted in the table 40, (a) periodically remove m least frequently used records or (b) remove the least frequently used record.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

I claim:

1. In a wireless communications network, a call processing method comprising:
    receiving a call to a directory number via a mobile switching center;
    checking whether number portability information for the directory number is stored in an internal portable directory number database in the mobile switching center, wherein the internal portable directory number database stores data relating to portable directory numbers, including their corresponding portability information such as an indication of whether the directory number is ported or not and an associated Location Routing Number if the directory number is a ported number;
    bypassing an external number portability database (NPDB) and routing the call based upon the number portability information for the directory number, when there is number portability information for the directory number stored in the portable directory number database; and
    when there is no number portability information for the directory number stored in the internal portable directory number database:
        sending a number portability request message to an NPDB in communication with the mobile switching center;
        receiving a number portability request return result from the NPDB;
        inserting a number portability record for the directory number in the internal portable directory number database; and
        routing the call using the number portability request return result received from the NPDB.

2. The method defined in claim 1, further comprising:
    storing a plurality of number portability records in the internal portable directory number database; and
    emptying the stored number portability records from the internal portable directory number database at a predetermined time interval.

3. The method defined in claim 1, further comprising:
    storing a plurality of number portability records in the internal portable directory number database;
    attaching a time stamp to each record; and
    removing at least one number portability record from the internal portable directory number database through a periodical audit on the database based upon the age of the number portability record according to the timestamp.

4. The method defined in claim 1, further comprising:
    updating the number portability record for the directory number in the internal portable directory number database whenever the mobile switching center misroutes a call based upon number portability information in the record.

5. The method defined in claim 1, wherein the number portability information for the directory number is stored in a table with a plurality of fields, and wherein the plurality of fields includes at least one of a directory number data field, a ported number data field, a location routing number data field, and a timestamp data field.

6. In a wireless communications network, a call processing system comprising:
    a mobile switching center for processing wireless calls;
    an internal portable directory number database in the mobile switching center for storing directory number information, wherein the internal portable directory number database stores data relating to portable directory numbers, including their corresponding portability information such as an indication of whether the number is ported or not and an associated Location Routing Number if it is a ported number; and
    means for facilitating communication between a caller and the mobile switching center, wherein the mobile switching center is programmed to:
        receive a wireless call to a directory number;

check whether number portability information for the directory number is stored in the internal portable directory number database;

bypass an external number portability database (NPDB) and route the call based upon the number portability information for the directory number, when there is number portability information for the directory number stored in the internal portable directory number database; and send a number portability request message to the external number portability database (NPDB), when there is no number portability information for the directory number stored in the internal portable directory number database;

receive a number portability request return result from the NPDB;

insert a record for the directory number in the internal portable directory number database; and route the call using the number portability request return result received from the NPDB.

7. The system defined in claim 6, wherein the mobile switching center is further programmed to:

store a plurality of number portability records in the internal portable directory number database; and empty the stored number portability records from the internal portable directory number database at a predetermined time interval.

8. The system defined in claim 6, wherein the mobile switching center is further programmed to:

store a plurality of number portability records in the internal portable directory number database;

attach a time stamp to each record; and remove at least one number portability record from the internal portable directory number database through a periodical audit on the database based upon the age of the number portability record according to the timestamp.

9. The system defined in claim 6, wherein the mobile switching center is further programmed to:

update the number portability record for the directory number in the internal portable directory number database whenever the mobile switching center misroutes a call based upon number portability information in the record.

10. The system defined in claim 6, wherein the number portability information for the directory number is stored in a table with a plurality of fields, and wherein the plurality of fields includes at least one of a directory number data field, a ported number data field, a location routing number data field, and a timestamp data field.

11. In a wireless communications network, a call processing system comprising:

receiving means for receiving a call to a directory number;

checking means for checking whether number portability information for the directory number is stored in an internal portable directory number database in mobile switching center, wherein the internal portable directory number database stores data relating to portable directory numbers, including their corresponding portability information such as an indication of whether the number is ported or not and the associated Location Routing Number if it is a ported number;

bypassing means for bypassing an external number portability database (NPDB) when there is number portability information for the directory number stored in the internal portable directory number database;

routing means for routing the call based upon the number portability information for the directory number;

sending means for sending a number portability request message to the external number portability database (NPDB) in communication with the mobile switching center, when there is no number portability information for the directory number stored in the internal portable directory number database;

accepting means for accepting a number portability request return result from the NPDB;

inserting means for inserting a record for the directory number if the internal portable directory number database does not include number portability information for the directory number; and routing means for routing the call using the number portability request return result from the NPDB.

12. The system defined in claim 11, further comprising:

storing means for storing a plurality of number portability records in the internal portable directory number database; and emptying means for emptying the number portability records from the internal portable directory number database at a predetermined time interval.

13. The system defined in claim 11, further comprising:

storing means for storing a plurality of number portability records in the internal portable directory number database;

attaching means for attaching a time stamp to each record; and removing means for removing at least one number portability record from the internal portable directory number database through a periodical audit on the database based upon the age of the number portability record according to the timestamp.

14. The system in claim 11, further comprising:

updating means for updating the number portability record for the directory number in the internal portable directory number database whenever the mobile switching center misroutes a call based upon number portability information in the record.

15. The system defined in claim 11, wherein the number portability information for the directory number is stored in a table with a plurality of fields, and wherein the plurality of fields includes at least one of a directory number data field, a ported number data field, a location routing number data field, and a timestamp data field.

* * * * *